US011315321B2

(12) United States Patent
Lucas et al.

(10) Patent No.: US 11,315,321 B2
(45) Date of Patent: Apr. 26, 2022

(54) VIEW DEPENDENT 3D RECONSTRUCTION MECHANISM

(71) Applicant: Intel Corporation, Santa Clara, CA (US)

(72) Inventors: Blake C. Lucas, San Francisco, CA (US); Jill Boyce, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 24 days.

(21) Appl. No.: 16/124,280

(22) Filed: Sep. 7, 2018

(65) Prior Publication Data

US 2019/0043253 A1 Feb. 7, 2019

(51) Int. Cl.
*G06T 15/00* (2011.01)
*G06T 17/20* (2006.01)
*G06T 15/10* (2011.01)
*G06T 9/00* (2006.01)
*G06T 15/20* (2011.01)

(52) U.S. Cl.
CPC .............. *G06T 17/20* (2013.01); *G06T 9/001* (2013.01); *G06T 15/10* (2013.01); *G06T 15/205* (2013.01)

(58) Field of Classification Search
None
See application file for complete search history.

(56) References Cited

U.S. PATENT DOCUMENTS

| 10,593,066 | B1 * | 3/2020 | Dhua | H04N 19/597 |
| 2004/0062437 | A1 * | 4/2004 | Luo | G06T 3/40 382/166 |
| 2009/0184956 | A1 * | 7/2009 | Kim | G06T 9/20 345/420 |
| 2010/0310155 | A1 * | 12/2010 | Newton | H04N 19/597 382/154 |
| 2012/0243774 | A1 * | 9/2012 | Chen | G06T 15/205 382/154 |
| 2013/0222369 | A1 * | 8/2013 | Huston | G06T 19/006 345/419 |
| 2014/0123507 | A1 * | 5/2014 | Gupta | G01B 11/002 33/1 M |
| 2014/0125650 | A1 * | 5/2014 | Neill | H04N 13/111 345/419 |
| 2014/0184744 | A1 * | 7/2014 | Liu | H04N 19/597 348/43 |

(Continued)

OTHER PUBLICATIONS

Kuang et al., A Compact Random-Access Representation for Urban Modeling and Rendering, ACM Trans. Graph. 32, 6, Article 172 (Nov. 2013), 12 pages (Year: 2013).*

(Continued)

*Primary Examiner* — Anh-Tuan V Nguyen
(74) *Attorney, Agent, or Firm* — Jaffery Watson Mendosa & Hamilton LLP

(57) ABSTRACT

An apparatus to facilitate encoding of point cloud data is disclosed. The apparatus includes one or more processors to receive point cloud data including a plurality of images and camera parameters, generate encoded point cloud data including a color texture image and a depth image having cropped regions for each of the plurality of images, and metadata to describe the camera parameters and a mapping of the cropped regions to a real coordinate space.

6 Claims, 8 Drawing Sheets

Texture Image 505

Base Mesh 502

(56) References Cited

U.S. PATENT DOCUMENTS

| | | | |
|---|---|---|---|
| 2015/0235392 A1* | 8/2015 | Sakurai | G06T 17/20 345/582 |
| 2015/0371410 A1* | 12/2015 | Hwang | G06T 11/001 345/582 |
| 2016/0050404 A1* | 2/2016 | Bruls | H04N 19/597 348/43 |
| 2016/0094829 A1* | 3/2016 | Georgiev | H04N 13/161 348/43 |
| 2016/0180586 A1* | 6/2016 | Marks | G06T 17/20 345/423 |
| 2017/0094262 A1* | 3/2017 | Peterson | H04N 21/854 |
| 2017/0103562 A1* | 4/2017 | Mitchell | G06T 13/20 |
| 2017/0231550 A1* | 8/2017 | Do | G06K 9/4652 382/128 |
| 2018/0137610 A1* | 5/2018 | Aflaki Beni | G06T 5/001 |
| 2018/0237235 A1* | 8/2018 | Justesen | B25J 15/0014 |
| 2019/0018505 A1* | 1/2019 | Cherukuri | G02B 27/0101 |
| 2019/0116352 A1* | 4/2019 | Pesonen | H04N 13/128 |
| 2019/0156518 A1* | 5/2019 | Mammou | G06T 19/20 |
| 2019/0242711 A1* | 8/2019 | Ingersoll | G01C 21/165 |
| 2019/0371051 A1* | 12/2019 | Dore | G06T 7/50 |
| 2019/0373278 A1* | 12/2019 | Castaneda | H04N 19/186 |
| 2020/0057778 A1* | 2/2020 | Sun | G06K 9/6215 |
| 2020/0068184 A1* | 2/2020 | Shadik | H04N 13/111 |
| 2020/0154137 A1* | 5/2020 | Fleureau | H04N 19/172 |
| 2020/0174130 A1* | 6/2020 | Banerjee | G05D 1/0248 |
| 2021/0192793 A1* | 6/2021 | Engelland-Gay | G06T 9/001 |

OTHER PUBLICATIONS

Collet, Alvaro, et al. "High-quality streamable free-viewpoint video." ACM Transactions on Graphics (TOG) 34.4 (2015): 69.

Debevec, Paul, Yizhou Yu, and George Borshukov. "Efficient view-dependent image-based rendering with projective texture-mapping." Rendering Techniques' 98. Springer, Vienna, 1998. 105-116.

Park, Jounsup, Philip A. Chou, and Jenq-Neng Hwang. "Rate-Utility Optimized Streaming of Volumetric Media for Augmented Reality." arXiv preprint arXiv: 1804.09864 (2018). Sugimoto, Kazuo, et al. "Trends in efficient representation of 3D point clouds." Asia-Pacific Signal and Information Processing Association Annual Summit and Conference (APSIPA ASC), 2017. IEEE, 2017.

Preda, Marius, "Point Cloud Compression in MPEG", MP20 Workshop Hong-Kong, Oct. 2017, 22 pages.

Kazhdan, Michael, and Hugues Hoppe. "Screened poisson surface reconstruction." ACM Transactions on Graphics (TOG) 32.3 (2013): 13 pages.

* cited by examiner

VIEW DEPENDENT 3D RECONSTRUCTION MECHANISM

FIELD OF INVENTION

This invention relates generally to video processing and more particularly to processing volumetric video content.

BACKGROUND OF THE DESCRIPTION

Volumetric media, popularly known as holograms, may be delivered to users for augmented reality (AR) and virtual reality (VR) applications, or immersive media on computing devices. As in video streaming, hologram streaming must support network adaptivity and fast startup, but must also support large bandwidths, multiple simultaneously streaming objects, and frequent user interaction, which requires low delay. Thus, streaming of volumetric content requires a substantial quantity of compression prior to transmission to a client. Existing solutions encode and compress volumetric content as textured meshes, in which ambient surface color is constant as a function of view direction. However, the constant color assumption holds only for diffuse surfaces and is violated in many real-world volumetric content captures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

In embodiments, a three-dimensional (3D) reconstruction mechanism receives point cloud data including images captured from of a plurality of camera views and renders the data via a virtual camera that matches the perspective of the plurality of camera views. A depth map for the rendering is segmented and decomposed into rectangular regions and packed into a single depth image in correspondence with a single color image. The depth map and the color image are encoded with metadata that provides a description of parameters of a plurality of cameras that captured the camera views and a mapping of the cropped regions to a real coordinate space. In further embodiments, the representation is subsequently decoded for rendering by inferring quadrilateral meshes from the depth map and compositing meshes from different views.

Figure 1:
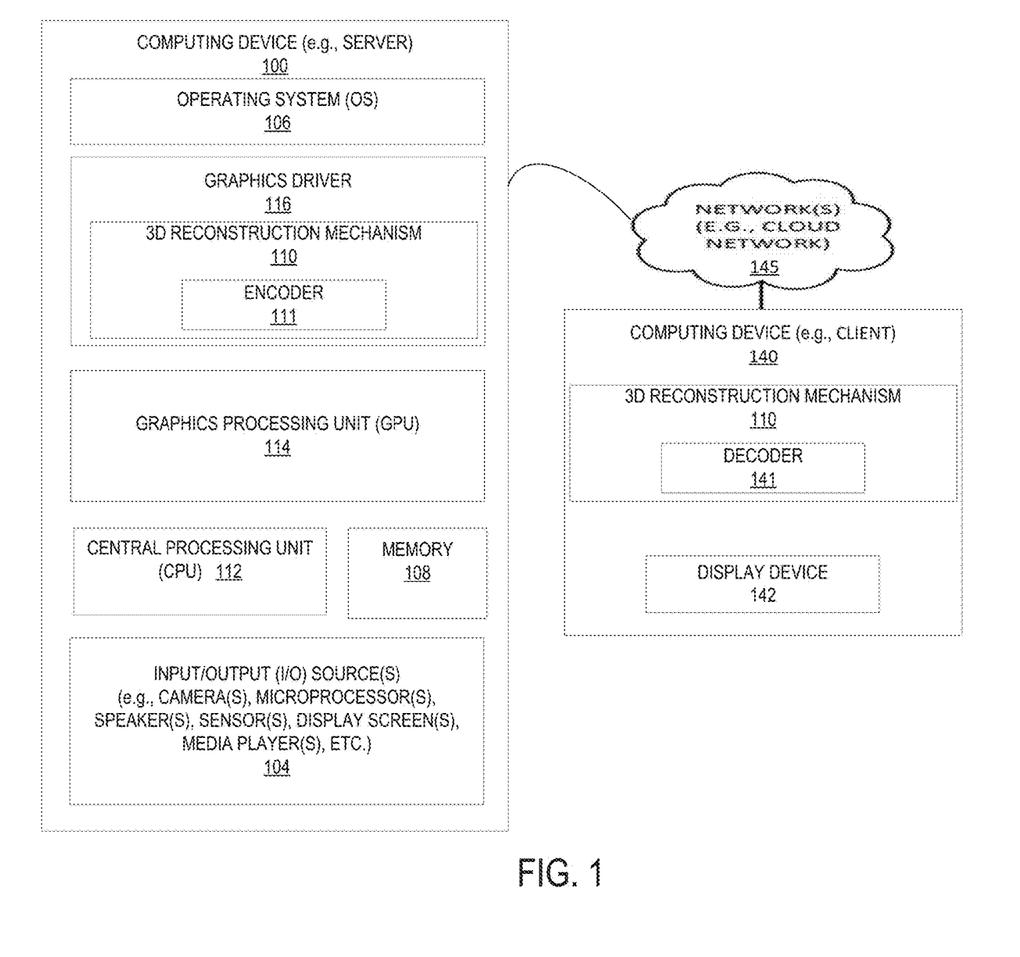
FIG. 1 illustrates a computing device employing a three-dimensional (3D) reconstruction mechanism, according to an embodiment.

FIG. 1 illustrates a three-dimensional (3D) reconstruction mechanism 110 according to one embodiment. For example, in one embodiment, 3D reconstruction mechanism ("reconstruction mechanism") 110 of FIG. 1 may be employed or hosted by computing device 100. Computing device 100 represents a communication and data processing device including or representing any number and type of smart devices, such as (without limitation) smart command devices or intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, etc.

In some embodiments, computing device 100 may include (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a cloud computing platform consisting of a plurality of server computers, where each server computer employs or hosts a multifunction perceptron mechanism. For example, automatic ISP tuning may be performed using component, system, and architectural setups described earlier in this document. For example, some of the aforementioned types of devices may be used to implement a custom learned procedure, such as using field-programmable gate arrays (FPGAs), etc.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 104, network devices, drivers, or the like, as well as input/output (I/O) sources 108, such as touchscreens, touch panels, touch pads, virtual or regular keyboards, virtual or regular mice, ports, connectors, etc. Computing device 100 may include operating system (OS) serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, as illustrated, reconstruction mechanism 110 may be hosted by graphics driver 116 of computing device 100. In another embodiment, reconstruction mechanism 110 may be hosted by or be part of operating system 106 of computing device 100. In another embodiment, reconstruction mechanism 110 may be hosted or facilitated by memory 104. In yet another embodiment, reconstruction mechanism 110 may be hosted by or part of graphics processing unit 114 ("GPU" or simply graphics processor") or firmware of graphics processor 114. For example, reconstruction mechanism 110 may be embedded in or implemented as part of the processing hardware of graphics processor 112. Similarly, in yet another embodiment, reconstruction mechanism 110 may be hosted by or part of central processing unit 112 ("CPU" or simply "application processor"). For example, reconstruction mechanism 110 may be embedded in or implemented as part of the processing hardware of application processor 112.

In yet another embodiment, reconstruction mechanism 110 may be hosted by or part of any number and type of components of computing device 100, such as a portion of reconstruction mechanism 110 may be hosted by or part of operating system 106, another portion may be hosted by or part of graphics processor 114, another portion may be hosted by or part of application processor 112, while one or more portions of reconstruction mechanism 110 may be hosted by or part of operating system 106 and/or any number and type of devices of computing device 100. It is contemplated that embodiments are not limited to certain implementation or hosting of reconstruction mechanism 110 and that one or more portions or components of reconstruction mechanism 110 may be employed or implemented as hardware, software, or any combination thereof, such as firmware.

According to one embodiment, computing device 100 is coupled to one or more client computing devices (or clients) 140 via one or more networks 145. In a further embodiment, client 140 also includes 3D reconstruction mechanism 110. In this embodiment, video processing mechanism 110 is implemented at computing device 100 as a video server to process and encode (e.g., via encoder 111) video data for transmission to a client 140 where the data is processed by reconstruction mechanism 110 (e.g., decoded via decoder 141) for rendering at a display device 142.

Accordingly, server 100 and client 140 may further include network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

As discussed above, constant color assumptions for ambient surface colors implemented during the encoding and compression of volumetric content as textured meshes is insufficient for many real-world volumetric content captures. For instance, current encoding solutions reduce view-dependent color variations to a single diffuse color associated with each mesh vertex. Inaccuracies in camera calibration or reconstructed geometry typically manifests as misalignment in texture projections. Several methods have been proposed for compensating for the misalignment through image warping and smart blending based on surface normal direction. However even after correction, the assumption that one color is adequate for all view directions detracts from photo-realism because the assumption does not hold for non-diffuse materials.

According to one embodiment, reconstruction mechanism 110 preserves view-dependent color information during the encoding and decoding of volumetric content. In such an embodiment, reconstruction mechanism 110 renders point cloud data via a virtual camera that matches a perspective of camera views, decomposes a depth map for the rendering into rectangular cropped regions and packs the cropped regions into a depth image corresponding with a color image. The depth map and the color image are encoded with metadata that provides a description of parameters of a plurality of cameras that captured the camera views and a mapping of the cropped regions to a real coordinate space.

Figure 2:
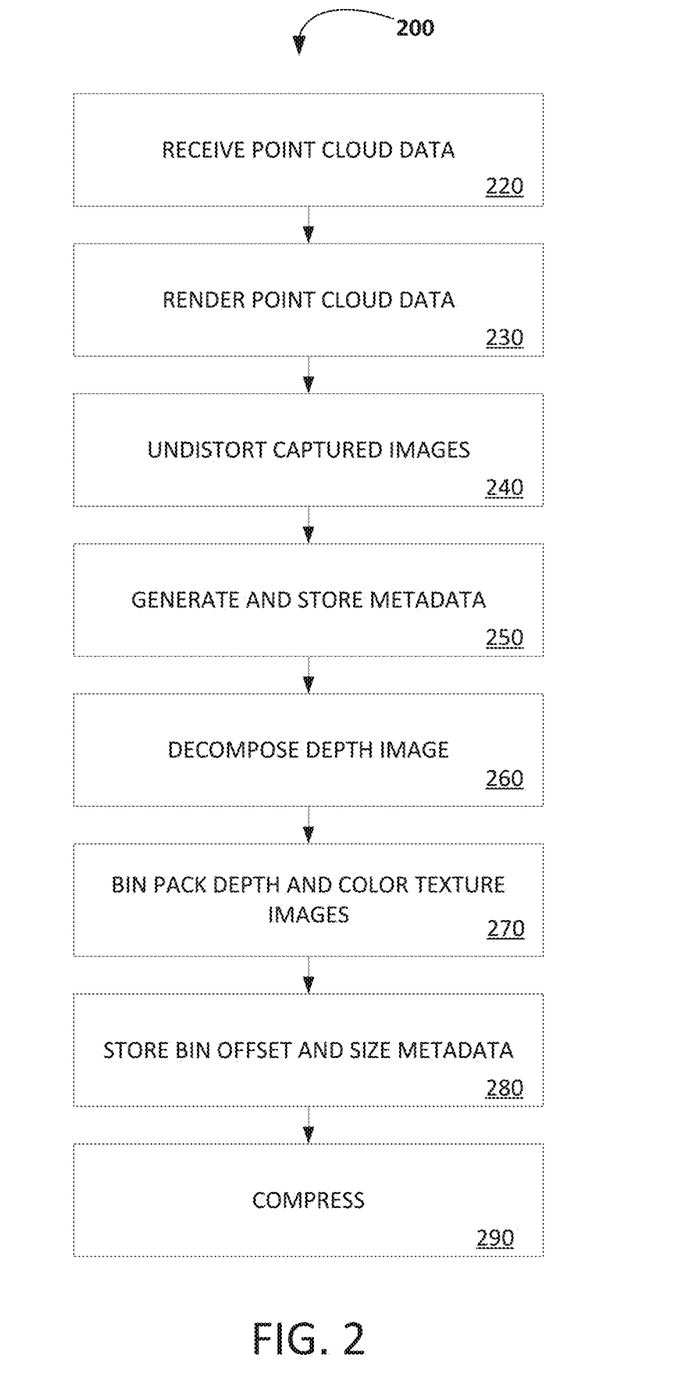
FIG. 2 is a flow diagram illustrating one embodiment of a process for encoding volumetric content.

According to one embodiment, reconstruction mechanism 110 implemented at server 100 includes an encoder 111 to encode captured volumetric content. FIG. 2 is a flow diagram illustrating one embodiment of an encoding method 200. Method 200 may be performed by processing logic that may comprise hardware (e.g., circuitry, dedicated logic, programmable logic, etc.), software (such as instructions run on a processing device), or a combination thereof. The processes of method 200 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIG. 1 may not be repeated or discussed hereafter.

Method 200 begins at processing block 220 where point cloud data is received. In one embodiment, the point cloud data is reconstructed from a set of images with known camera parameters (e.g., multi-view 3D reconstruction). At processing block 230, the point cloud data is rendered. In one embodiment, the point cloud data is rendered using a virtual camera to match the camera perspective for the captured images (e.g., using the camera parameters). As a result, a depth map is provided for each image having an intensity at each image pixel that corresponds to a distance from a camera center to the point cloud.

At processing block 240, the captured images are undistorted to match intrinsic parameters of the camera. At processing block 250, depth map metadata is generated and stored. In one embodiment, the metadata includes a minimum depth for each depth map and corresponding virtual camera parameters. In one embodiment, depth measurements are converted into millimeters with the minimum depth subtracted, and subsequently encoded as 16 bit unsigned integers.

At processing block 260, each depth map image is decomposed to form axis-aligned rectangular cropped regions by performing two-dimensional (2D) connected component analysis on each frame. In one embodiment, a depth map that matches the original image size is stored. However in other embodiments, a user may resize the depth image via a user interface to match one or more pre-specified restrictions on a maximum image size to limit memory foot print per frame. In a further embodiment, each pixel in the depth map image is in 1:1 correspondence with the color image. How-ever in other embodiments, the mapping ratio may be changed to 1:2 or 1:4 for enhanced compression.

At processing block 270, the cropped rectangular regions from the depth map, along with their corresponding regions in the color map, are bin-packed into a depth and color texture image, respectively, to maximize area usage. At processing block 280, bin offset and size metadata that map the cropped regions to a real coordinate space is stored. At processing block 280, the color image and depth image are compressed. According to one embodiment, the color image is compressed as a Joint Photographic Experts Group (JPG) image, and the depth image is compressed with lossless Lempel-Ziv-Welch (LZW) compression. In other embodiment, the color and depth images may be compressed with a video codec such as H.264/MPEG-4 Part 10, Advanced Video Coding (MPEG-4 AVC) (H.264/AVC) or High Efficiency Video Coding (HEVC).

Figure 3:
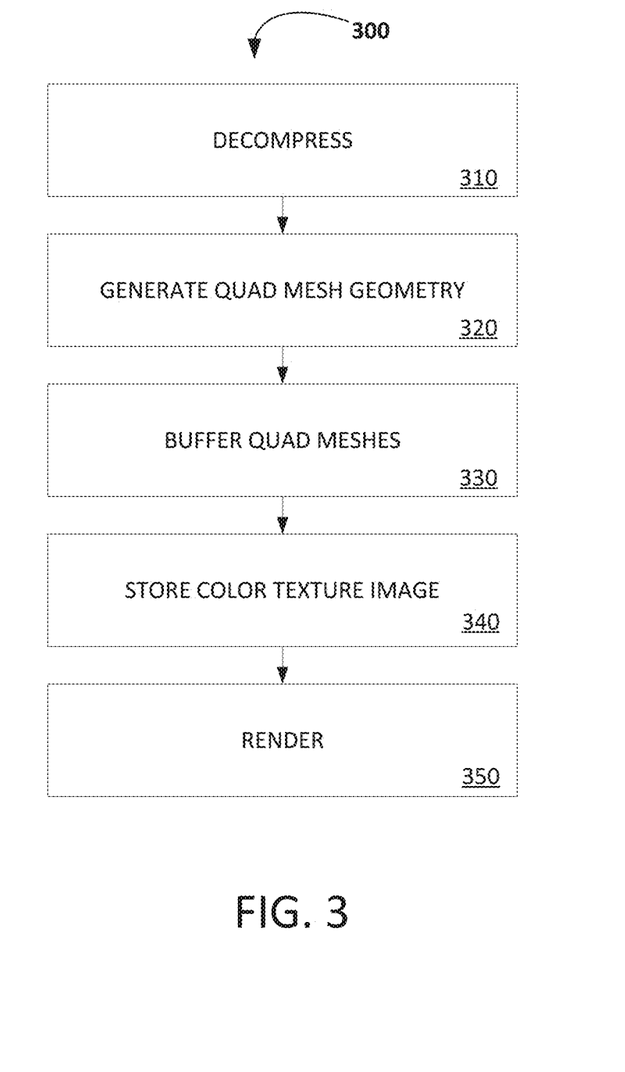
FIG. 3 is a flow diagram illustrating one embodiment of a process for decoding volumetric content.

According to one embodiment, reconstruction mechanism 110 implemented at client 140 includes a decoder 141 to decode the content encoded received from server 100. FIG. 3 is a flow diagram illustrating one embodiment of a decoding method 300. Method 300 may be performed by processing logic that may comprise hardware (e.g., circuitry, dedicated logic, programmable logic, etc.), software (such as instructions run on a processing device), or a combination thereof. The processes of method 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1&2 may not be repeated or discussed hereafter.

Method 300 begins at processing block 310 where frame data is decompressed. In one embodiment, each frame is decompressed into 8 bit Red-Green-Blue (RGB) color and 16 bit gray level depth images from their compressed representation as either JPG/LZW images or video. In a further embodiment, the decompressed data is subsequently uploaded to a graphics card along with metadata using an application programming interface (API).

At processing block 320, a quad mesh geometry is generated by determining the original pixel coordinates for each depth sample and back-projecting the depth measurement into a real-world space to form a list of mesh vertices. In one embodiment, one quad mesh is generated for each encoded view direction. In some embodiments, duplicate/overlapping mesh vertices may occur as a side-effect of having camera images with overlapping field of views. However, such occurrences are tolerable compared to the complexity of encoding multiple camera correspondences per vertex. In a further embodiment, the topology of each quad mesh is inferred by emitting a quad for each pixel (i,j) in the depth image that has valid neighbors at (i+1,j), (i,j+1), (i+1,j+1). Each vertex is also associated with a UV coordinate in the texture image for rendering as texture mapped polygons.

At processing block 330, the quad meshes are buffered. In such an embodiment, the quad meshes are packed into the buffers in increasing camera order such that meshes for specific views can be easily rendered by specifying begin/end ranges. At processing block 340, the color texture image is stored as a standard texture for faster rendering and compatibility with the graphics driver 116 shaders. At processing block 350, the data is rendered.

Figure 4:
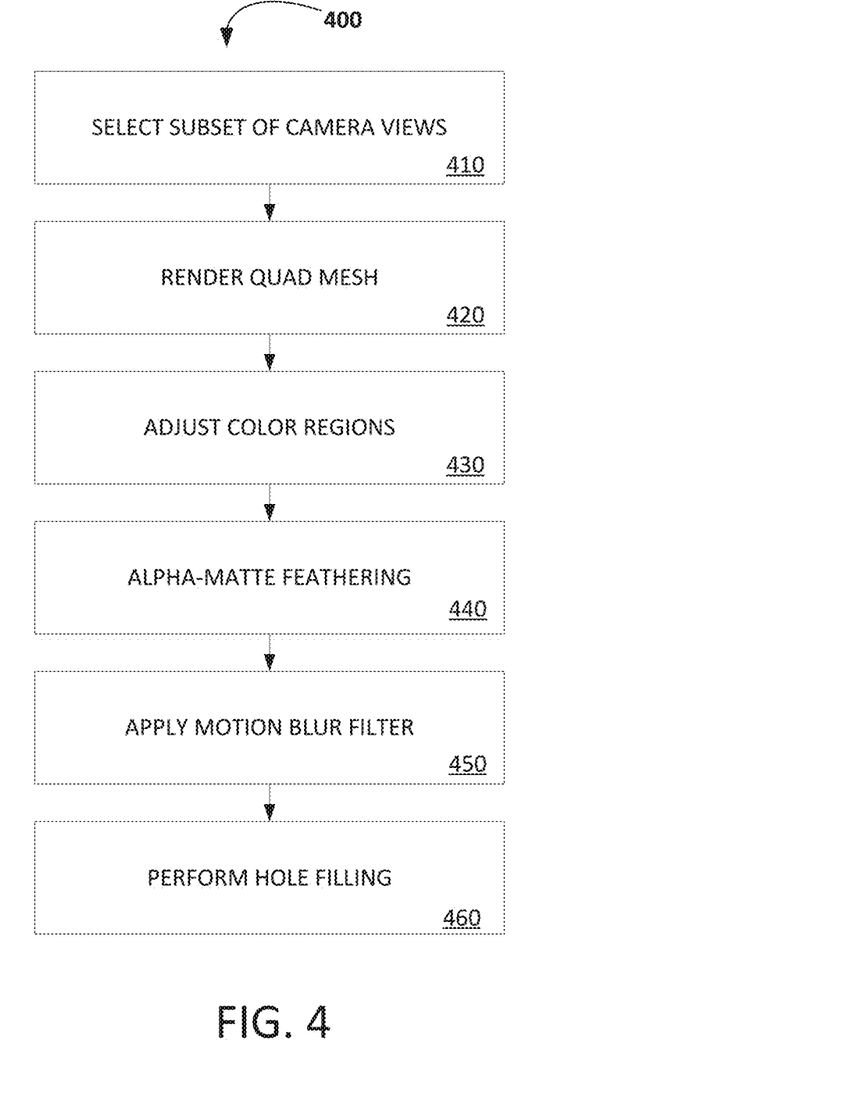
FIG. 4 is a flow diagram illustrating one embodiment of a process for rendering volumetric content.

FIG. 4 is a flow diagram illustrating one embodiment of a rendering method 400. Method 400 may be performed by processing logic that may comprise hardware (e.g., circuitry, dedicated logic, programmable logic, etc.), software (such as instructions run on a processing device), or a combination thereof. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated or discussed hereafter.

Method 400 begins at processing block 410 where a subset of camera views are selected from the original set that are closest to the current virtual camera perspective. In one embodiment, this is performed by sorting camera views by difference in a camera z-axis direction relative to the virtual camera's z-axis direction. At processing block 420, the quad meshes are rendered. Starting with the camera view closest to the virtual camera, the quad mesh for the corresponding view is rendered with applicable color and depth based on the metadata. In one embodiment, this process is repeated for subsequent views. However, the color for subsequent views is merged into a final render image only if the region of space for the view has not been filled by a previous view, or the depth map indicates the quad mesh is well in front of previous renders. In one embodiment, a per pixel test is implemented to determine if a new mesh is "well in front" of previous renders within a predetermined distance tolerance.

At processing block 430, color regions that are added to the scene are adjusted for brightness and contrast to optimally match previous renders in regions where there is overlap. At processing block 440, alpha-matte feathering is performed along the boundary interface between existing and added regions to blend/hide seams in image spaces. At processing block 450, a motion blur filter is applied when the camera view is changed in order to hide "visual popping" as different subsets of camera projections are selected. The above-described greedy rendering process mitigates blurring and mismatches between color textures by providing much of the current rendering perspective with a single image and adding information from additional views only in regions that were not observed by closer camera perspectives. Optimally, a 3D reconstruction appears as good as an image taken from the virtual camera perspective. As a result, images taken from a nearby perspective should dominate the rendered field of view.

Previous solutions implement a weighted averaging of colors from multiple views, which creates blur attributable to inaccuracy in the 3D reconstructed geometry and/or camera calibration that leads to texture misalignment. Moreover, blur is exacerbated by increasing the number of camera views that are blended together. Thus, implementing a greedy rendering enables virtual camera rendering to more accurately resemble the original captured images as the number of camera views used in the reconstruction increases.

At processing block 460, hole filling is performed. Typically, there are regions of the 3D reconstruction not seen by any cameras for which color and point cloud information can be inferred. According to one embodiment, hole filling is performed to fill in these holes and complete the model. In such an embodiment, a low polygon base mesh is constructed via a Poisson Reconstruction with per-vertex color. In a further embodiment, the mesh is rendered last and merged with the final color image using the same procedure for quad meshes. This process enables fast mesh playback to be performed using low polygon meshes and blend in high quality color textures as more data is loaded.

Figure 5A:
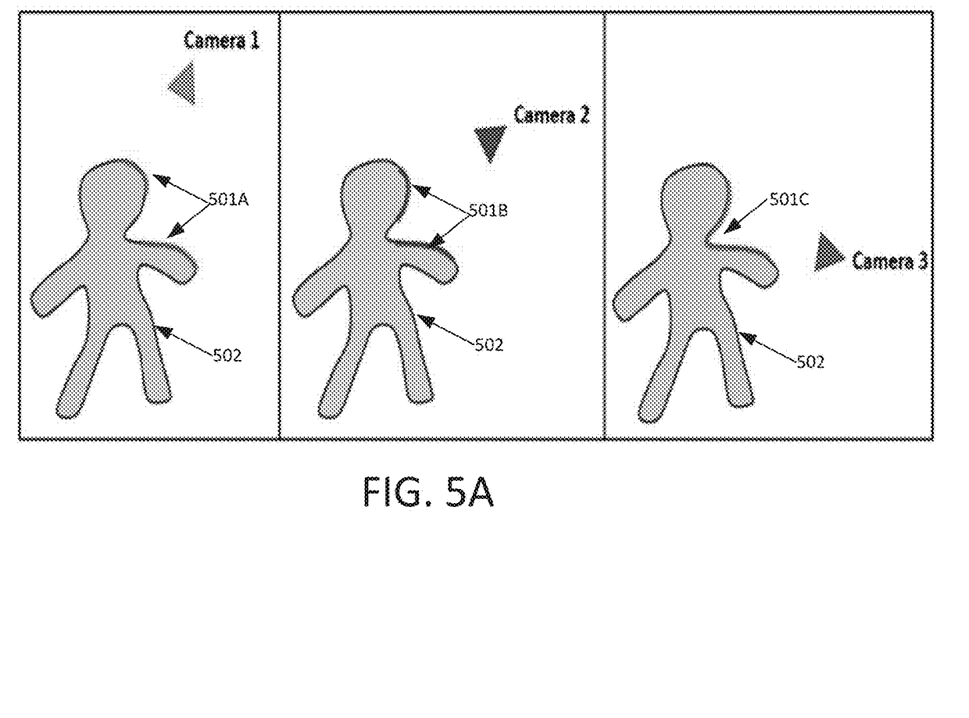
FIGS. 5A-5C illustrate embodiments of a multi-view image capture.
Figure 5B:
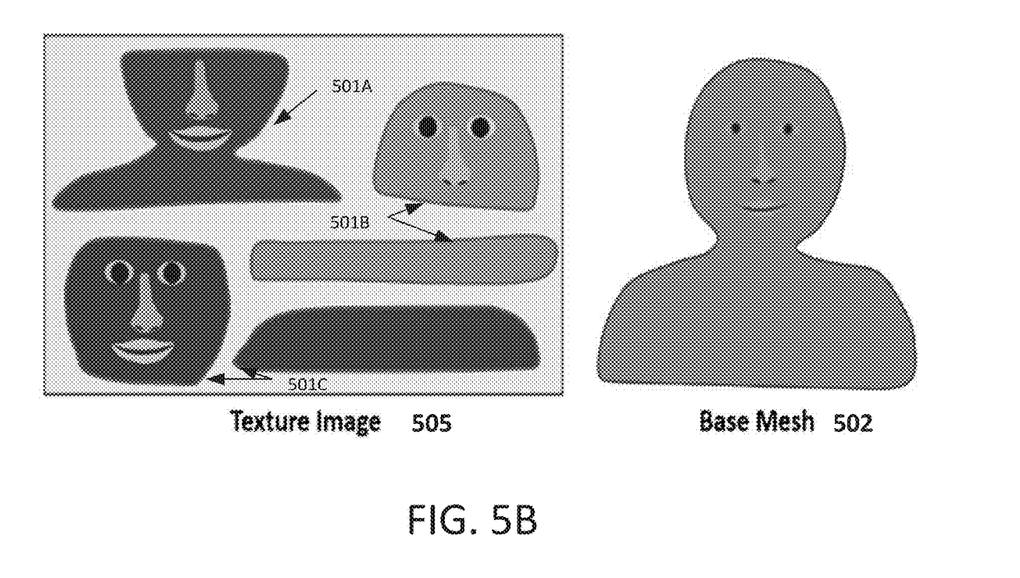
Figure 5C:
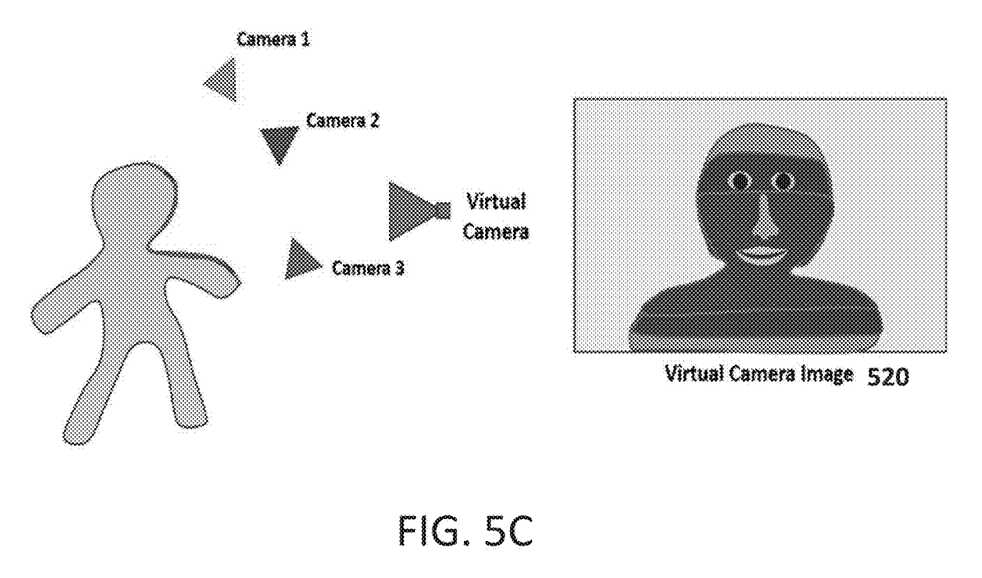

FIGS. 5A & 5B illustrate embodiments of an implementation of reconstruction mechanism 110 for a multi-view image capture. FIG. 5A illustrates an embodiment of image capture from three different camera views. Partial reconstructed surfaces for cameras 1, 2, and 3 are depicted as 501A, 501B, and 501C, respectively; as well as a low quality base mesh 502. FIG. 5B illustrates an embodiment of a texture image 505 corresponding to the camera views in FIG. 5A, as well as the low quality base mesh 502. In this instance, the base mesh color may appear blurry due to having less fidelity. FIG. 5C illustrates an embodiment in which a virtual camera image 520 is generated using the above-described rendering (or compositing) process.

The above described 3D reconstruction mechanism provides enhanced visual fidelity due to the mesh being rendered using crops from original high resolution images, rather than from resampling, warping, and blending colors from different views. Additionally, the 3D reconstruction mechanism changes colors used for rendering based on the virtual camera view.

Figure 6:
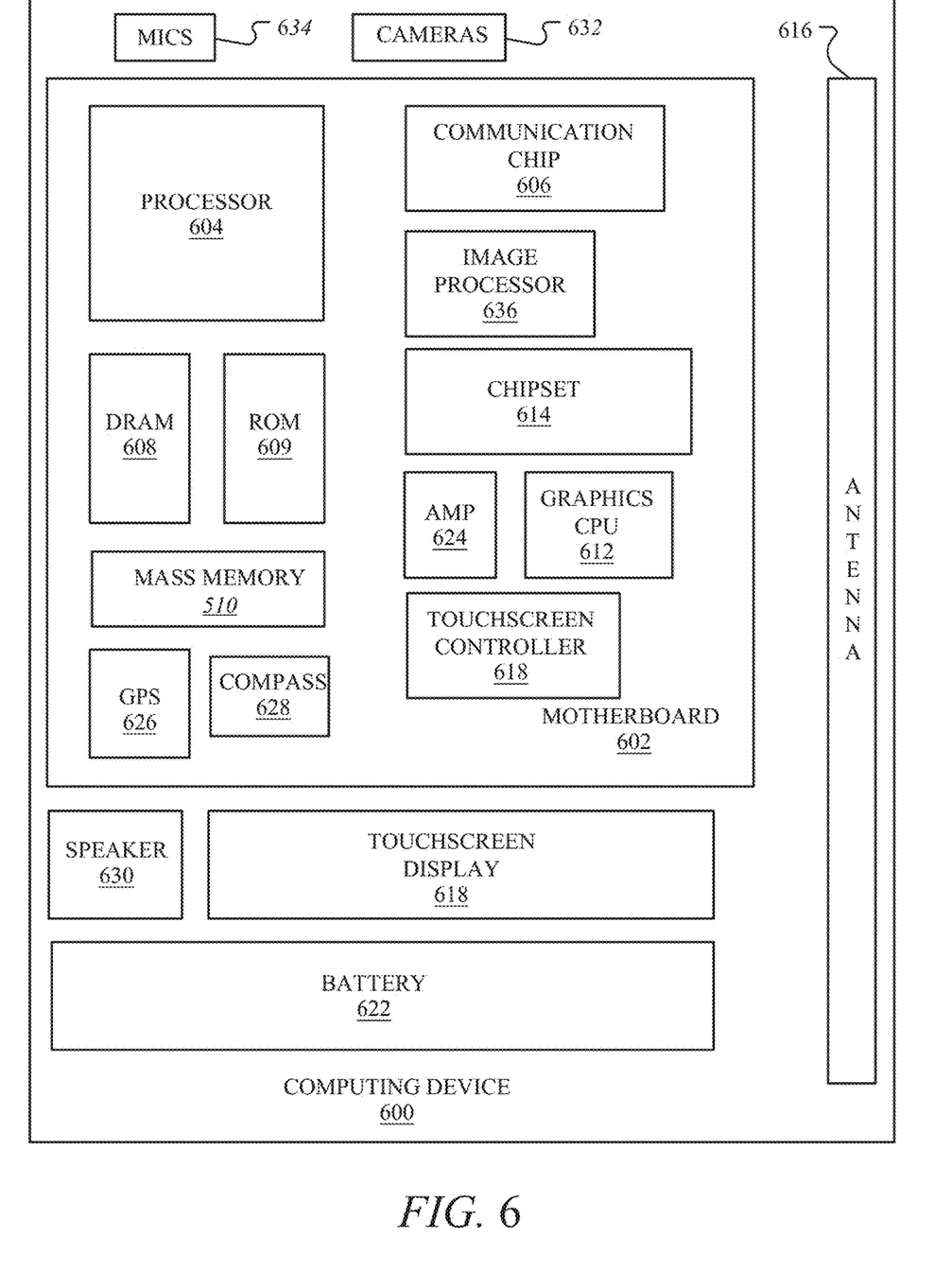
FIG. 6 illustrates a computer device capable of supporting and implementing one or more embodiments according to one embodiment.

FIG. 6 illustrates a computing device 600 in accordance with one implementation. It is contemplated that computing device 600 may be the same as or similar to computing device 100 of FIG. 1 and thus for brevity, many of the details discussed with reference to computing device 100 of FIG. 1 are not discussed or repeated hereafter. Computing device 600 houses a system board 602. The board 602 may include a number of components, including but not limited to a processor 604 and at least one communication package 606. The communication package is coupled to one or more antennas 616. The processor 604 is physically and electrically coupled to the board 602.

Depending on its applications, computing device 600 may include other components that may or may not be physically and electrically coupled to the board 602. These other components include, but are not limited to, volatile memory (e.g., DRAM) 608, non-volatile memory (e.g., ROM) 609, flash memory (not shown), a graphics processor 612, a digital signal processor (not shown), a crypto processor (not shown), a chipset 614, an antenna 616, a display 618 such as a touchscreen display, a touchscreen controller 620, a battery 622, an audio codec (not shown), a video codec (not shown), a power amplifier 624, a global positioning system (GPS) device 626, a compass 628, an accelerometer (not shown), a gyroscope (not shown), a speaker 630, cameras 632, a microphone array 634, and a mass storage device (such as hard disk drive) 610, compact disk (CD) (not shown), digital versatile disk (DVD) (not shown), and so forth). These components may be connected to the system board 602, mounted to the system board, or combined with any of the other components.

The communication package 606 enables wireless and/or wired communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 606 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 600 may include a plurality of communication packages 606. For instance, a first communication package 606 may be dedicated to shorter range wireless communications such as Wi-Fi and Bluetooth and a second communication package 606 may be dedicated to longer range wireless communications such as GPS, EDGE, GPRS, CDMA, WiMAX, LTE, Ev-DO, and others.

The cameras 632 including any depth sensors or proximity sensor are coupled to an optional image processor 636 to perform conversions, analysis, noise reduction, comparisons, depth or distance analysis, image understanding and other processes as described herein. The processor 604 is coupled to the image processor to drive the process with interrupts, set parameters, and control operations of image processor and the cameras. Image processing may instead be performed in the processor 604, the graphics CPU 612, the cameras 632, or in any other device.

In various implementations, the computing device 600 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 600 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 7:
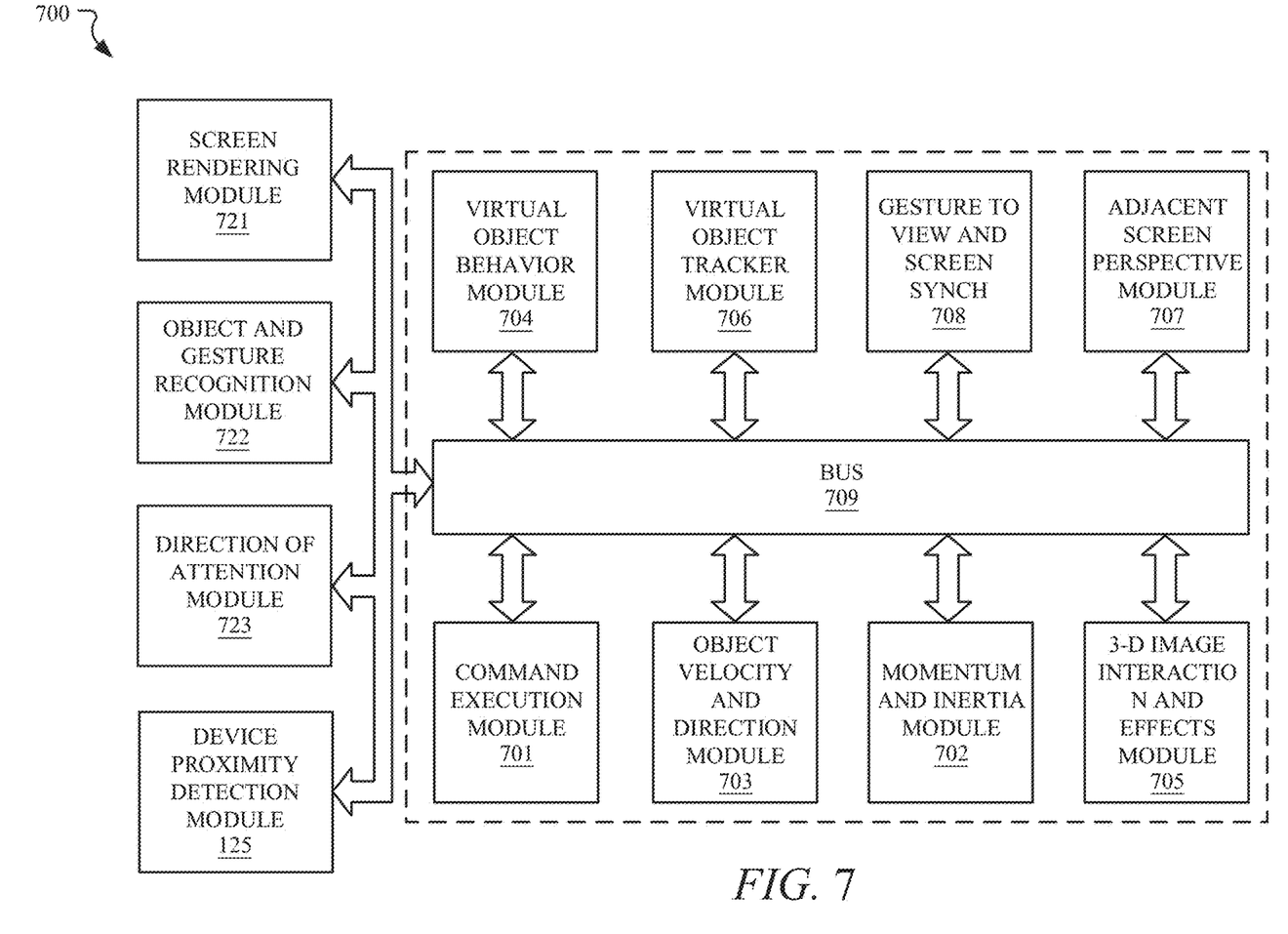
FIG. 7 illustrates an embodiment of a computing environment capable of supporting and implementing one or more embodiments according to one embodiment.

FIG. 7 illustrates an embodiment of a computing environment 700 capable of supporting the operations discussed above. The modules and systems can be implemented in a variety of different hardware architectures and form factors including that shown in FIG. 6.

The Command Execution Module 701 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 721 draws objects on the one or more multiple screens for the user to see. It can be adapted to receive the data from the Virtual Object Behavior Module 704, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 707, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 722 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 723 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 722 to ensure that the gestures or commands are associated with the appropriate library for the active display. Similarly, if the user is looking away from all of the screens, then commands can be ignored.

The Device Proximity Detection Module 725 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 722. For a display device, it may be considered by the Adjacent Screen Perspective Module 707.

The Virtual Object Behavior Module 704 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 706 on the other hand may be adapted to track where a virtual object should be located in three-dimensional space in a vicinity of a display, and which body part of the user is holding the virtual object, based on input from the Object and Gesture Recognition Module. The Virtual Object Tracker Module 706 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 708, receives the selection of the view and screen or both from the Direction of Attention Module 723 and, in some cases, voice commands to determine which view is the active view and which screen is the active screen. It then causes the relevant gesture library to be loaded for the Object and Gesture Recognition Module 722. Various views of an application on one or more screens can be associated with alternative gesture libraries or a set of gesture templates for a given view.

The Adjacent Screen Perspective Module 707, which may include or be coupled to the Device Proximity Detection Module 725, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 707 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 703 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 702 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 705 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 701, 702, 703, 704, 705, 706, 707, and 708 are connected via an interconnect or a bus, such as bus 709.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate encoding of point cloud data, comprising one or more processors to receive point cloud data including a plurality of images and camera parameters, generate encoded point cloud data including a color texture image and a depth image including cropped regions for each of the plurality of images, and metadata to describe the camera parameters and a mapping of the cropped regions to a real coordinate space.

Example 2 includes the subject matter of Example 1, wherein the one or more processors further to generate a depth map for an image and store depth map metadata corresponding to the depth map.

Example 3 includes the subject matter of Examples 1 and 2, wherein the metadata comprises a minimum depth for the depth map and corresponding camera parameters.

Example 4 includes the subject matter of Examples 1-3, wherein the one or more processors further to decompose each depth map into a plurality of rectangular regions to form the cropped regions.

Example 5 includes the subject matter of Examples 1-4, wherein the metadata further comprises bin offset and size metadata to map the cropped regions to the real coordinate space.

Example 6 includes the subject matter of Examples 1-5, wherein the one or more processors further to compress the color texture images and the depth images.

Some embodiments pertain to Example 7 that includes an apparatus to facilitate decoding of point cloud data, comprising one or more processors to receive encoded point cloud data including a color texture image and depth image including cropped regions for each of a plurality of images and metadata to describe the camera parameters and a mapping of the cropped regions to a real coordinate space, infer a plurality of quadrilateral meshes from the cropped regions and render each of the plurality of quadrilateral meshes using corresponding cropped regions and color texture images to generate three-dimensional (3D) point cloud data Example 8 includes the subject matter of Example 7, wherein each quadrilateral mesh corresponds to a camera view.

Example 9 includes the subject matter of Examples 7 and 8, wherein the one or more processors further to apply a motion blur filter when a camera view is changed.

Example 10 includes the subject matter of Examples 7-9, wherein the one or more processors further to perform hole filling to fill holes in the 3D point cloud data.

Example 11 includes the subject matter of Examples 7-10, wherein the one or more processors further to decompress the encoded point cloud data.

Some embodiments pertain to Example 12 that includes at least one computer readable medium having instructions stored thereon, which when executed by one or more processors, cause the processors to receive point cloud data including a plurality of images and camera parameters and generate encoded point cloud data including a color texture image and a depth image including cropped regions for each of the plurality of images, and metadata to describe the camera parameters and a mapping of the cropped regions to a real coordinate space.

Example 13 includes the subject matter of Example 12, having instructions stored thereon, which when executed by one or more processors, further cause the processors to generate a depth map for an image and store depth map metadata corresponding to the depth map.

Example 14 includes the subject matter of Examples 13 and 14, wherein the metadata comprises a minimum depth for the depth map and corresponding camera parameters.

Example 15 includes the subject matter of Examples 12-14, having instructions stored thereon, which when executed by one or more processors, further cause the processors to decompose each depth map into a plurality of rectangular regions to form the cropped regions.

Example 16 includes the subject matter of Examples 12-15, wherein the metadata further comprises bin offset and size metadata to map the cropped regions to the real coordinate space.

Example 17 includes the subject matter of Examples 12-16, having instructions stored thereon, which when executed by one or more processors, further cause the processors to compress the color texture images and the depth images.

Some embodiments pertain to Example 18 that includes at least one computer readable medium having instructions stored thereon, which when executed by one or more processors, cause the processors to receive encoded point cloud data including a color texture image and depth image including cropped regions for each of a plurality of images, and metadata to describe the camera parameters and a mapping of the cropped regions to a real coordinate space, infer a plurality of quadrilateral meshes from the cropped regions, wherein each quadrilateral mesh corresponds to a camera view and render each of the plurality of quadrilateral meshes using corresponding cropped regions and color texture images to generate three-dimensional (3D) point cloud data.

Example 19 includes the subject matter of Example 18, wherein the one or more processors further to apply a motion blur filter when a camera view is changed.

Example 20 includes the subject matter of Examples 18 and 19, wherein the one or more processors further to perform hole filling to fill holes in the 3D point cloud data.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An apparatus comprising:
one or more processors to:
receive point cloud data including a plurality of images and camera parameters associated with a camera, wherein the point cloud data is associated with a point cloud;
generate encoded point cloud data including a color texture image of the plurality of images, and depth map metadata associated with the color texture image to describe the camera parameters and a mapping of the cropped regions to a real coordinate space;
generate a depth map for the color texture image based on the depth map metadata, and store the depth map metadata, wherein the depth map is segmented and decomposed into axis-aligned rectangular cropped regions, wherein the rectangular cropped regions and corresponding regions in the color texture image are bin-packed into a single depth image and the color texture image, respectively to maximize area usage, and store bin offset and size metadata that are used to map the rectangular cropped regions to the real coordinate space, wherein the depth map for the color texture image is further based on a level of intensity relating to an image pixel corresponding to a distance from a center of the camera to the point cloud; and
facilitate compression of the color texture image and the depth image, wherein the compressed color texture image and the depth image offers rendering by inferring quadrilateral meshes from the depth map and composition meshes from different views associated with the color texture image.

2. The apparatus of claim 1, wherein the metadata comprises a minimum depth for the depth map and corresponding camera parameters, wherein the depth image is resizable to match one or more pre-specified restrictions on a maximum image size to limit memory footprint per frame, wherein the quadrilateral meshes are packed into one or more buffers in increasing camera order such that the quadrilateral meshes for specific views are specified by begin/end ranges.

3. At least one non-transitory computer-readable medium having instructions stored thereon, which when executed, cause a computing device to perform operations comprising:
receive point cloud data including a plurality of images and camera parameters associated with a camera, wherein the point cloud data is associated with a point cloud;
generate encoded point cloud data including a color texture image of the plurality of images, and depth map metadata associated with the color texture image to describe the camera parameters and a mapping of the cropped regions to a real coordinate space;
generate a depth map for the color texture image based on the depth map metadata, and store the depth map metadata, wherein the depth map is segmented and decomposed into axis-aligned rectangular cropped regions, wherein the rectangular cropped regions and corresponding regions in the color texture image are bin-packed into a single depth image and the color texture image, respectively to maximize area usage, and store bin offset and size metadata that are used to map the rectangular cropped regions to the real coordinate space, wherein the depth map for the color texture image is further based on a level of intensity relating to an image pixel corresponding to a distance from a center of the camera to the point cloud; and
facilitate compression of the color texture image and the depth image, wherein the compressed color texture image and the depth image offers rendering by inferring quadrilateral meshes from the depth map and composition meshes from different views associated with the color texture image.

4. The non-transitory computer-readable medium of claim 3, wherein the metadata comprises a minimum depth for the depth map and corresponding camera parameters, wherein the depth image is resizable to match one or more pre-specified restrictions on a maximum image size to limit memory footprint per frame, wherein the quadrilateral meshes are packed into one or more buffers in increasing camera order such that the quadrilateral meshes for specific views are specified by begin/end ranges.

5. A computer-implemented method for facilitating encoding of point cloud data, the method comprising:
receiving point cloud data including a plurality of images and camera parameters associated with a camera, wherein the point cloud data is associated with a point cloud;
generating encoded point cloud data including a color texture image of the plurality of images, and depth map metadata associated with the color texture image to describe the camera parameters and a mapping of the cropped regions to a real coordinate space;
generating a depth map for the color texture image based on the depth map metadata, and store the depth map metadata, wherein the depth map is segmented and decomposed into axis-aligned rectangular cropped regions, wherein the rectangular cropped regions and corresponding regions in the color texture image are bin-packed into a single depth image and the color texture image, wherein the depth map for the color texture image is further based on a level of intensity relating to an image pixel corresponding to a distance from a center of the camera to the point cloud; and
facilitating compression of the color texture image and the depth image, respectively to maximize area usage, and store bin offset and size metadata that are used to map the rectangular cropped regions to the real coordinate space, wherein the compressed color texture image and the depth image offers rendering by inferring quadrilateral meshes from the depth map and composition meshes from different views associated with the color texture image.

6. The computer-implemented method of claim 5, wherein the metadata comprises a minimum depth for the depth map and corresponding camera parameters, wherein the depth image is resizable to match one or more pre-specified restrictions on a maximum image size to limit memory footprint per frame, wherein the quadrilateral meshes are packed into one or more buffers in increasing camera order such that the quadrilateral meshes for specific views are specified by begin/end ranges.

* * * * *